United States Patent
Parness

(10) Patent No.: US 9,668,456 B2
(45) Date of Patent: Jun. 6, 2017

(54) INTERACTIVE DATA RETENTION AND DISPLAY PET BALL LAUNCHER

(71) Applicant: Michael Parness, Foxfield, CO (US)

(72) Inventor: Michael Parness, Foxfield, CO (US)

(73) Assignee: Outward Hound LLC, Centennial, CO (US)

( * ) Notice: Subject to any disclaimer, the term of this patent is extended or adjusted under 35 U.S.C. 154(b) by 0 days.

(21) Appl. No.: 14/754,692

(22) Filed: Jun. 30, 2015

(65) Prior Publication Data
US 2017/0001087 A1    Jan. 5, 2017

(51) Int. Cl.
*A01K 29/00* (2006.01)
*A63B 65/12* (2006.01)
*A01K 15/02* (2006.01)
*A63B 59/20* (2015.01)
*A63B 60/12* (2015.01)
*A63B 71/06* (2006.01)
*F41B 3/04* (2006.01)

(52) U.S. Cl.
CPC ............ *A01K 15/025* (2013.01); *A63B 59/20* (2015.10); *A63B 60/12* (2015.10); *A63B 65/122* (2013.01); *A63B 71/06* (2013.01); *F41B 3/04* (2013.01); *A01K 15/021* (2013.01)

(58) Field of Classification Search
CPC ....... A01K 15/025; A01K 15/021; F41B 3/04; A63B 2225/50
USPC ................................ 119/707; 124/5; 700/91
See application file for complete search history.

(56) References Cited

U.S. PATENT DOCUMENTS

| | | | | | |
|---|---|---|---|---|---|
| 5,292,134 | A * | 3/1994 | Schlundt | ............. | A63B 65/122 124/65 |
| 6,076,829 | A * | 6/2000 | Oblack | .................. | A63B 59/20 124/5 |
| 6,477,745 | B2 * | 11/2002 | Strebl | .................... | A63B 59/20 24/11 R |
| 6,604,946 | B2 * | 8/2003 | Oakes | .................... | F42B 5/025 102/444 |
| 7,861,676 | B2 * | 1/2011 | Kates | .................... | A01K 15/02 119/720 |
| 8,517,003 | B2 * | 8/2013 | Fisher | .................. | A01K 15/025 124/5 |
| 8,683,958 | B2 * | 4/2014 | Oblack | .................... | F41B 3/04 119/707 |
| 8,720,385 | B2 * | 5/2014 | Tanner | ................. | A01K 15/025 119/707 |
| 9,004,976 | B2 * | 4/2015 | Rosenberg | .............. | F41A 33/00 446/435 |
| 9,010,279 | B1 * | 4/2015 | Saber | .................. | A01K 27/003 119/702 |
| 9,010,309 | B2 * | 4/2015 | Lewis | .................... | A63B 69/40 124/4 |
| 9,017,188 | B2 * | 4/2015 | Joseph | .............. | A63B 24/0075 473/422 |
| 9,303,942 | B2 * | 4/2016 | Sievers | ................. | A63H 33/18 |

(Continued)

*Primary Examiner* — Alexander Niconovich
(74) *Attorney, Agent, or Firm* — Patent Partners LLC

(57) ABSTRACT

The invention relates to a novel interactive pet ball launcher wherein digital circuitry in the ball and launcher will wirelessly track and record throw data, allowing a User to view the data on a readout in the launcher handle, or to transfer the data to a smartphone or computer via wireless technology or a data dongle that connects via USB in the handle of the launcher.

7 Claims, 4 Drawing Sheets

(56) References Cited

U.S. PATENT DOCUMENTS

| | | | | |
|---|---|---|---|---|
| 2008/0200287 A1* | 8/2008 | Marty | ............... | A63B 24/0003 |
| | | | | 473/459 |
| 2008/0216765 A1* | 9/2008 | Kates | ................... | A01K 15/02 |
| | | | | 119/712 |
| 2008/0261711 A1* | 10/2008 | Tuxen | ............... | A63B 24/0021 |
| | | | | 473/199 |
| 2011/0018994 A1* | 1/2011 | Russoniello | ......... | A01K 15/025 |
| | | | | 348/143 |
| 2012/0256731 A1* | 10/2012 | Luciano, Jr. | ....... | A63B 37/0003 |
| | | | | 340/10.1 |
| 2013/0102419 A1* | 4/2013 | Jeffery | .................. | A63B 69/00 |
| | | | | 473/409 |
| 2013/0267339 A1* | 10/2013 | Boyd | ................... | A63B 69/36 |
| | | | | 473/223 |
| 2013/0274040 A1* | 10/2013 | Coza | ................. | G09B 19/0038 |
| | | | | 473/570 |
| 2015/0038048 A1* | 2/2015 | Rosenberg | .............. | F41A 33/00 |
| | | | | 446/429 |
| 2015/0328516 A1* | 11/2015 | Coza | ................... | A63B 69/002 |
| | | | | 473/446 |

* cited by examiner

INTERACTIVE DATA RETENTION AND DISPLAY PET BALL LAUNCHER

FIELD

The invention relates to a novel pet ball launcher having data retention and display capability. For instance, the handle contains an on-board module which will display data regarding the ball launch such as ball speed, distance, and number of throws. Another embodiment would allow any smart phone is attachable to the handle and uses its own internal gyroscope/sensors to measure launch data. The phone would attach by way of a cage grip so it is secure to the handle of the thrower. Alternately, in the base of the handle a removable sensor stores data from the launched balls and then can be connected via micro USB or a sync dongle to a user's smartphone, tablet, laptop or computer to download information. Data transfer is achieved via a wireless transmitter in the ball which sends performance data to either a Smartphone, on-board module, or the connected dongle.

BACKGROUND OF THE INVENTION

The invention most closely corresponds with USPTO Class 414/1/5 wherein Class 414 relates to material or article handling and subclass 1 relates to article manipulator which moves analogous with human hand, finger or arm movement. Subclass 5 relates to means to transmit feedback signal from manipulator means to hand, finger or arm.

In its simplest form, the invention relates to a novel ball launcher that is interactive with respect to wirelessly reading data regarding the launch and retaining the data in either a Smartphone, on-board circuitry or a removable dongle that can be then read by a computer. The ball launcher is comprised of an elongate flexible handle with a grip at one end and a scoop at the opposing end, wherein the scoop contains opposing portions which generally create a ball-shaped recess to frictionally hold the ball. When a User swings the handle with sufficient force, the friction fit releases such that the ball will then "launch" out of the scoop.

As we know regarding Smartphones, digital technology is used to convert data, such as short messages, e-mail or digital pictures, into small packets. Packets are transmitted securely over wireless systems as a series of 0's and 1's. Thus a Smartphone can act as a receiver of data when interacting with the transmitter resident in the ball launcher. The on-board module processes much like a Smartphone in that it gathers data, can store it, and ultimately send that data to a source such as an app or computer program.

A dongle is a piece of hardware that attaches to a computer via a USB connection, and allows a piece of secured software to run. The device does not contain the software in its entirety, but rather is an electronic key that unlocks the program on a computer. With the inventive ball launcher, a dongle resides in the tip of the handle and can also record data related to the activity of the launcher.

THE INVENTION

Summary, Objects and Advantages

The inventive ball launcher functions in a similar manner to manual handheld ball launchers that we routinely use to interact with our pets. The novelty of the inventive launcher is that it can track, record, and display data gathered that tells us something about the "performance" of the launch and of the pet's interaction with the toy.

Much like exercise technology that tracks number of steps, distance traveled, speed of travel over distance, etc., the same type of data can be synthesized from the electronic capability of the launcher and the ball.

With the inventive toy, data such as speed and distance of ball launch can be recorded. This data can be transmitted either to a user's Smartphone which attaches to the handle in a secure fashion, to the onboard circuitry, or via a wireless dongle that resides in the end tip of the launcher handle. A data readout panel is also integrated into the on-board module located in the handle of the launcher which will allow the User to see certain data displayed thereon as received by the onboard circuitry.

After play, a user can then review the gathered data or can manipulate it in some fashion. An example would be to transfer the data to software which will then categorize the data into an easily read format. This data can then in turn interact with software media such as a blog or website and display the data to a group of users belonging to that web based community.

The ball will have a transmitter embedded within to wirelessly transmit the data to either the receiving Smartphone, onboard circuitry or dongle. Gathered data is then ready for a User to either download to a computer or to read directly from a Smartphone application. Standard USB connections are used to connect the dongle or a User can connect their Smartphone to the computer to transfer the data if they choose. Charging the handle device can be accomplished via AC or USB.

BRIEF DESCRIPTION OF THE DRAWINGS

The invention is described in further detail by reference to six (6) drawings sufficient in detail to describe the invention in which.

DETAILED DESCRIPTION, INCLUDING BEST MODES OF CARRYING OUT THE INVENTION

Figures 1, 2:
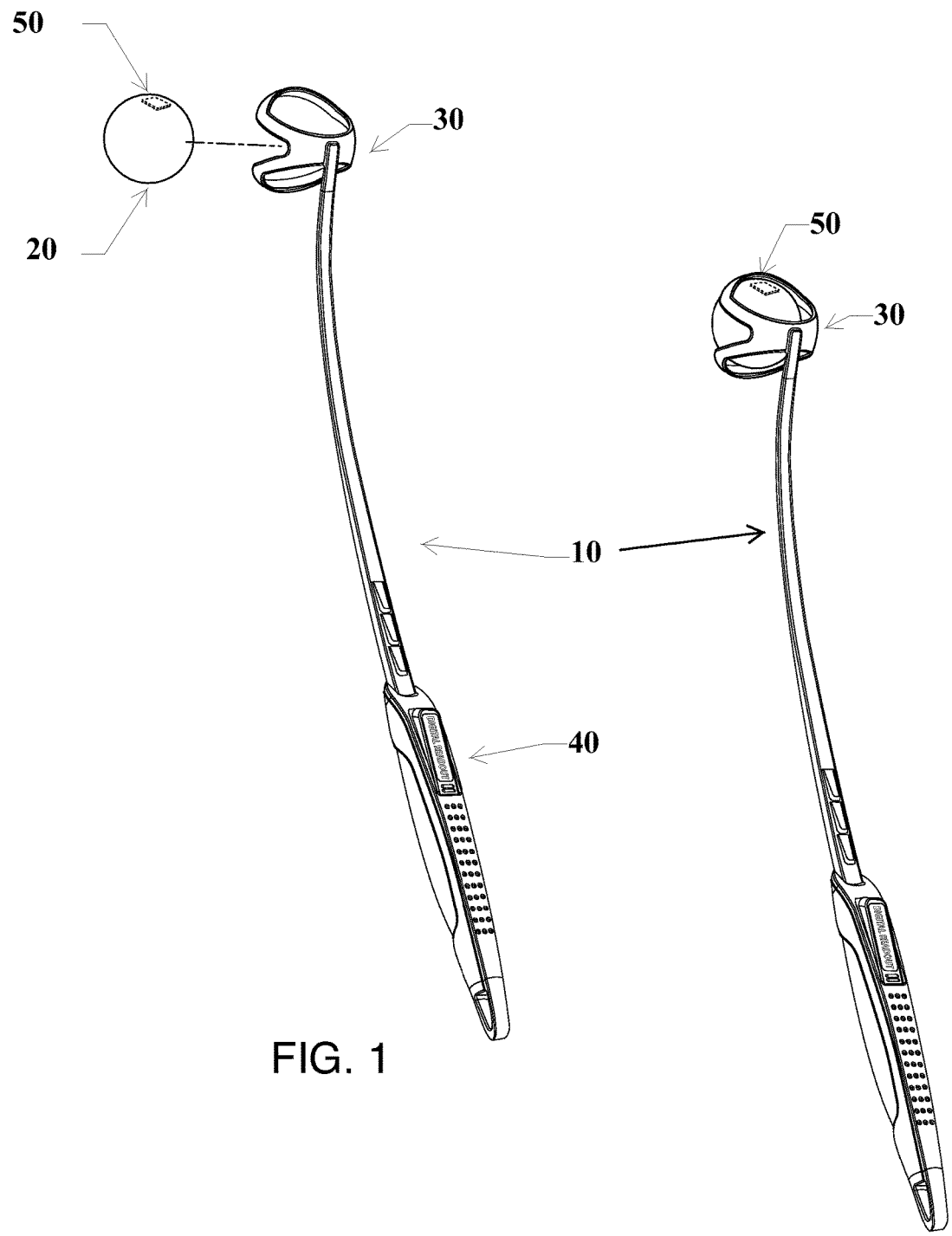
FIG. 1 shows the launcher with a ball leaving the scoop.
FIG. 2 shows the launcher with a ball set into the scoop.

FIG. 1 shows the 10, with a ball 20 leaving the scoop 30. The scoop portion provides a friction fit for the ball and standard kinetics allow the ball to leave the scoop when the launcher is arced back and released forward. A digital data readout panel 40 is shown as integrated into the handle. This readout contains a receiver that can accept the data from the ball's transmitter and display the data on the panel. The ball receiver 50 is shown in phantom as it would reside within the ball for protection from landing, surface scraping and moisture to an extent.

FIG. 2 is a simple illustration of the launcher 10 with a ball 20 fit into the scoop 30. Again, the ball's transmitter 50 is shown in phantom as it would reside within the ball for protection from landing, surface scraping and moisture to an extent. The digital readout panel 40 is again illustrated.

Figure 3:
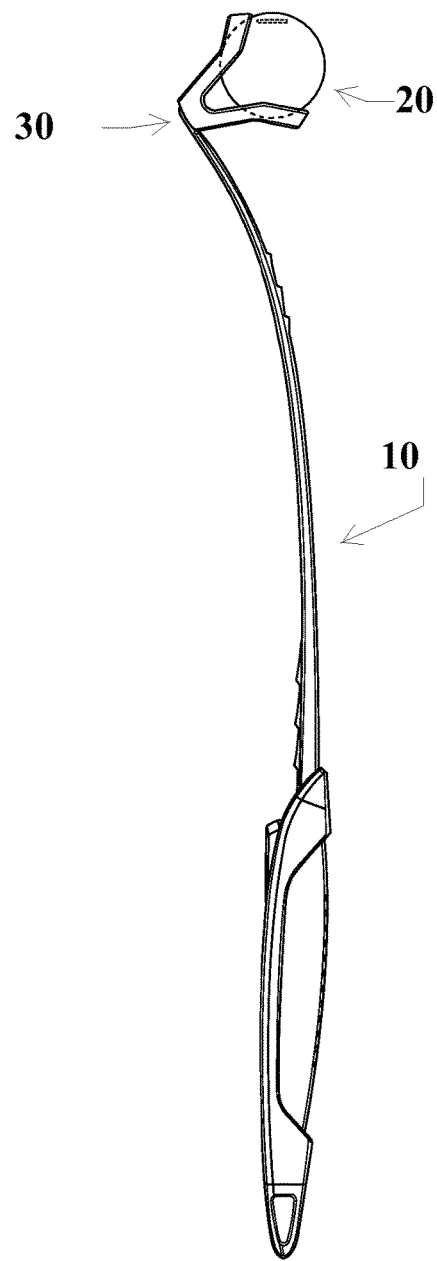
FIG. 3 is a side view of the launcher with a ball set into the scoop.

FIG. 3 is a side perspective of the launcher 10 with a ball 20 nested in the scoop 30. Of note is the fit. The ball is friction fit into the scoop and when inertia is applied, the ball easily releases from the launcher.

Figure 4:
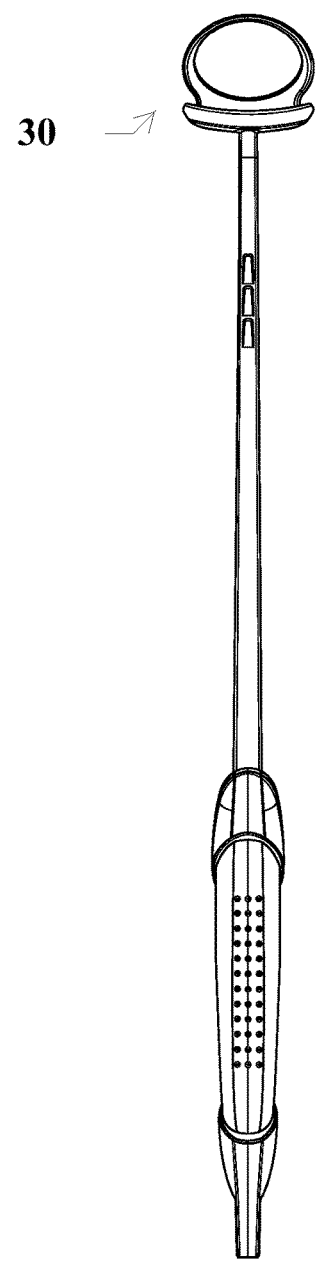
FIG. 4 is a front view of the launcher.

FIG. 4 is a simple front perspective of the launcher more clearly illustrating the scoop 30. A ball is inserted between the top and bottom sections of the scoop creating a friction fit. Release angle and force occurs dependent upon the User's launch trajectory and swing applied.

Figure 5:
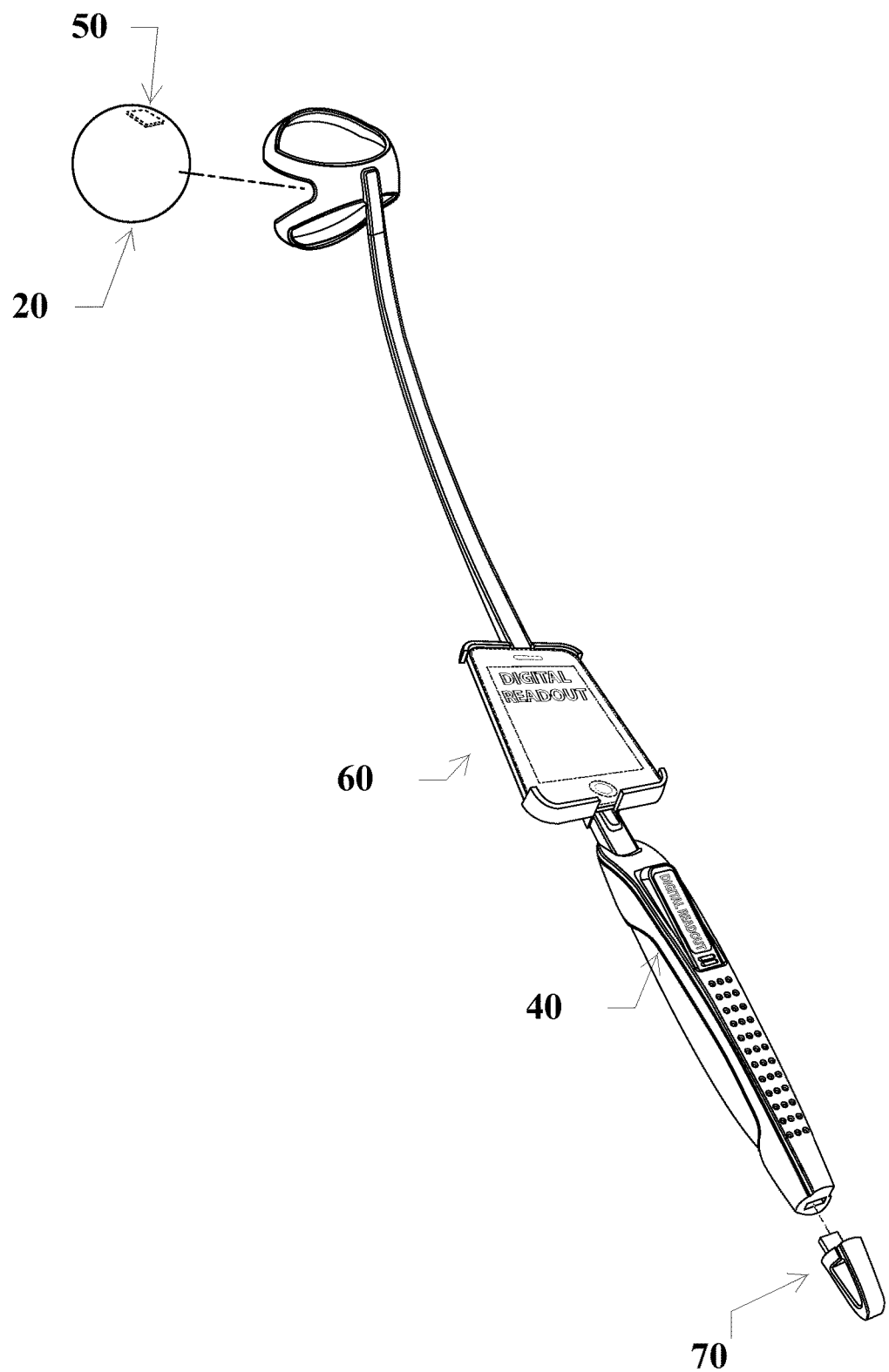
FIG. 5 is an illustration of the launcher with both a Smartphone and a dongle attached.

FIG. 5 is an exaggerated view of a Smartphone 60 as affixed to the handle of the launcher. As the ball 20 is released, the sensor 50 in the ball will communicate with the Smartphone 60, or alternately the dongle 70 at the end of the handle. The digital readout 40 on the handle of the launcher can also display collected data, but is not removable as with the phone and dongle. The data recorded includes but is not limited to force or speed of the throw, distance of the throw, and time it takes the pet to retrieve the ball. Other data sets can obviously be included in this process.

Figure 6:
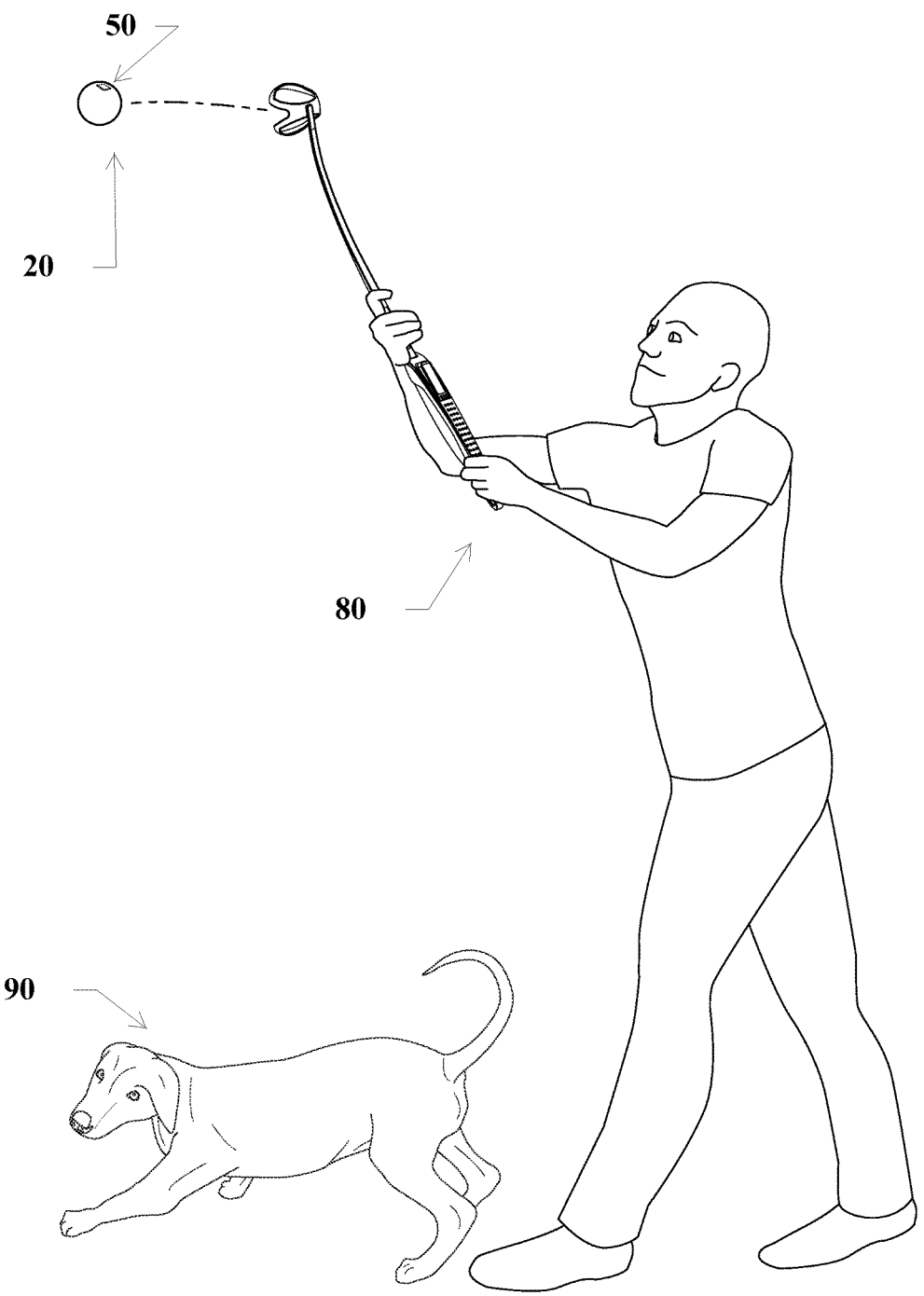
FIG. 6 is an illustration of the launcher in use.

FIG. 6 is a simple illustration of a User 80 launching a ball 20 which contains the transmitting device 50. Data from the throw begins to be recorded as the pet 90 pursues the ball. Another embodiment of the present invention is that a pet's collar may also contain a transmitter which can record performance, and such data will be received by one of the methods disclosed herein. The Smartphone or the launcher handle receiver can collect data and that recorded data may be transferable via the dongle or wireless via the phone's technology if so equipped.

The invention claimed is:

1. An interactive data retention and display pet ball launcher comprising:
   a) an elongated flexible handle with a grip at one end and scoop portion at an opposing end wherein the handle has one end for receiving a data device and wherein the opposing end is the scoop portion having two opposing portions forming a generally ball-shaped recess to frictionally retain a ball until the handle is swung with force sufficient to release the ball from the scoop
   b) a receiving piece for a smartphone connected to the handle portion
   c) a removable data dongle located in the end of the handle portion for receiving and storing data
   d) a digital module with display located on the handle of the launcher
   e) a ball equipped with electronics for communicating to the launcher's digital module or a smart phone.

2. The interactive data retention and display pet ball launcher as in claim 1 wherein internal electronics in the ball transmit data to the receiving ball launcher or to a smartphone wherein the smartphone is attached by a user to the handle.

3. The interactive data retention and display pet ball launcher as in claim 1 wherein the handle is designed to comfortably fit a user's hand and wherein the scoop portion holds the ball via a friction fit until a user swings the handle with sufficient force that the ball overcomes the frictional retaining force of the scoop and is then launched from the scoop.

4. The interactive data retention and display pet ball launcher as in claim 1 wherein the receiving piece is located on the handle for receiving and securely holding most brands of smartphones.

5. The interactive data retention and display pet ball launcher as in claim 1 wherein the removable data dongle is located in a recessed slot at a tip of the launcher handle and wherein the dongle is removed from the recessed slot and allowing the transfer of its stored data via connection to a computer.

6. The interactive data retention and display pet ball launcher as in claim 1 wherein the digital module is integrated into the launcher handle and which displays collected throw data communicated from the transmitting ball.

7. The interactive data retention and display pet ball launcher as in claim 1 wherein internal electronic circuitry within the ball will communicate with the data dongle and provide readable data back to the handle's digital module.

* * * * *